Patented Sept. 20, 1932

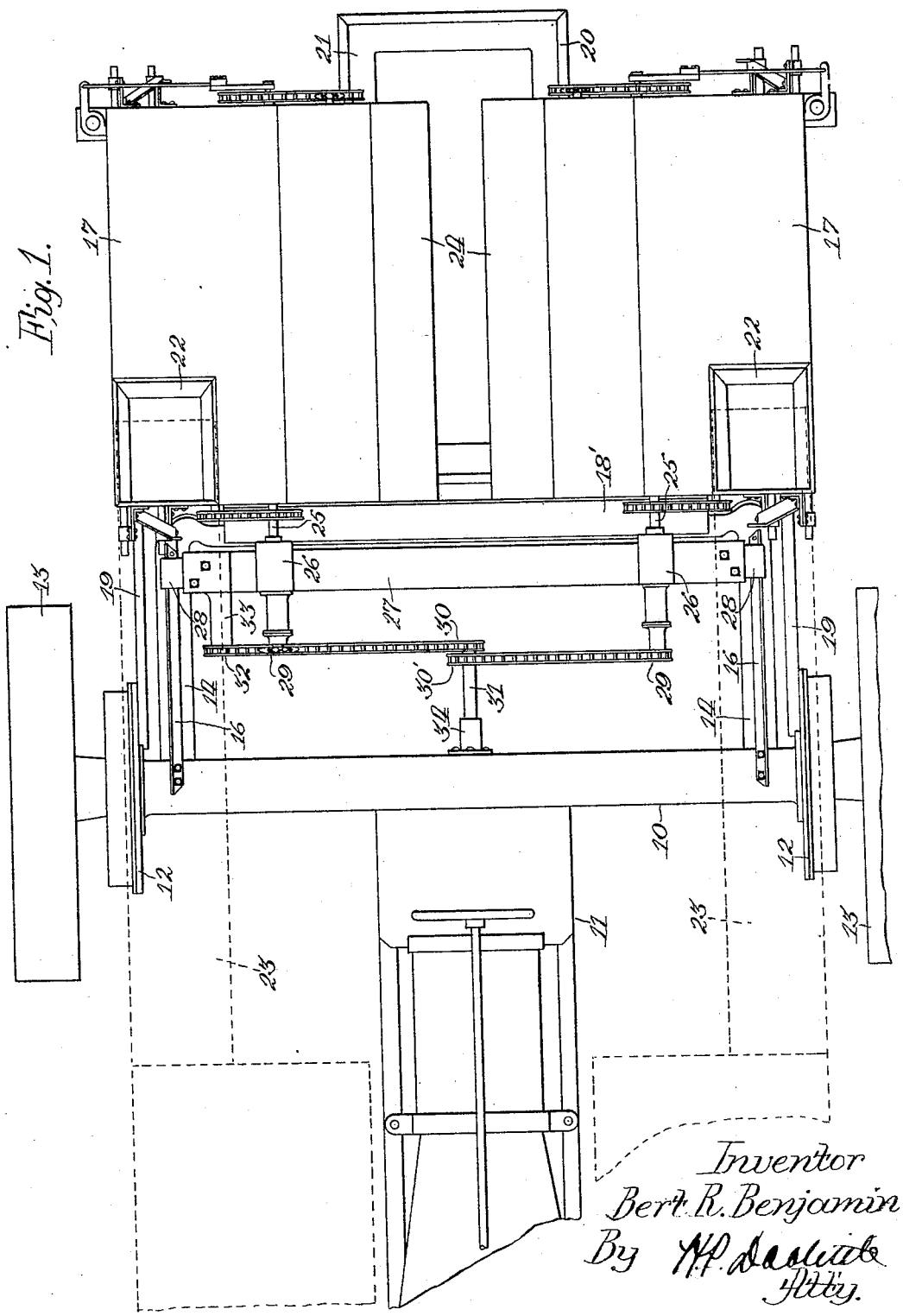

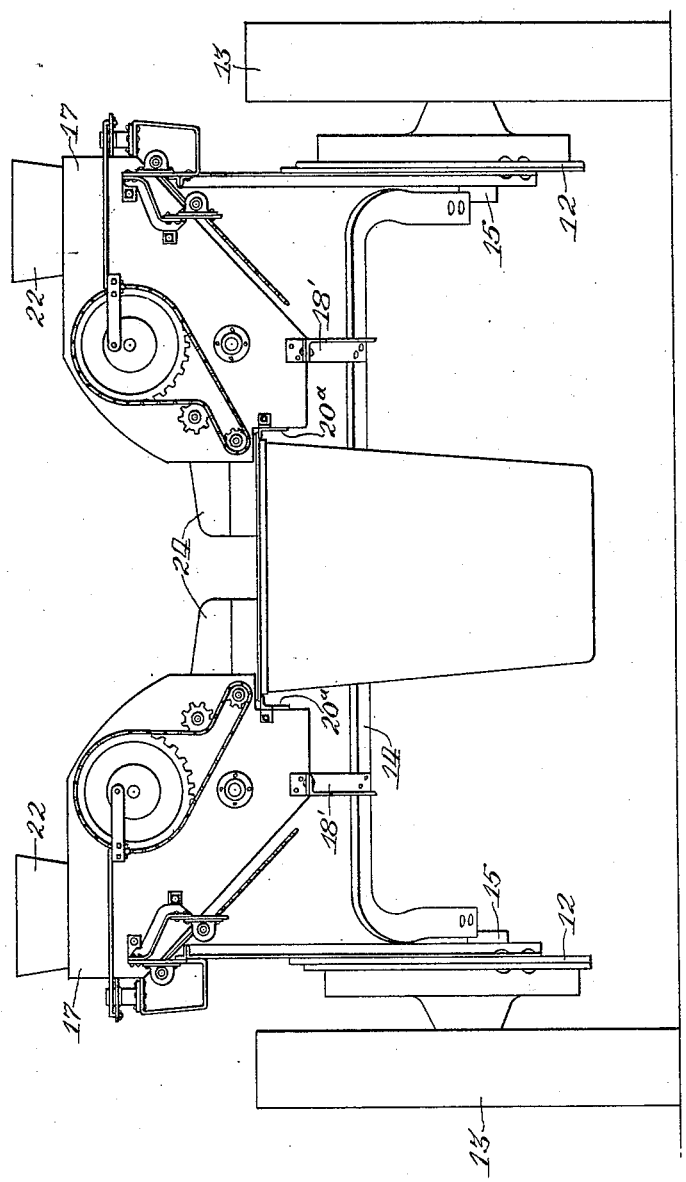

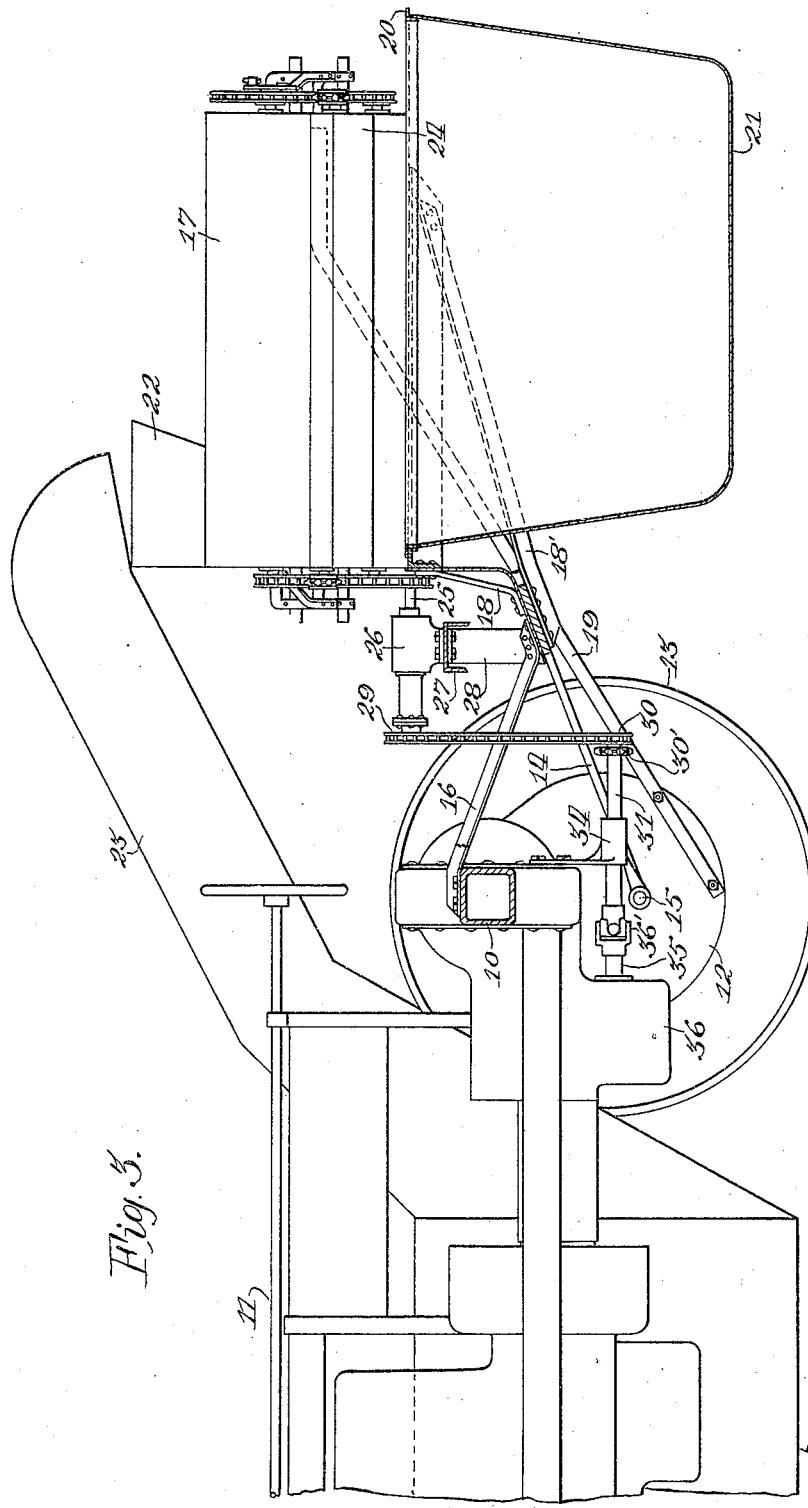

1,878,662

UNITED STATES PATENT OFFICE

BERT R. BENJAMIN, OF OAK PARK, ILLINOIS, ASSIGNOR TO INTERNATIONAL HARVESTER COMPANY, A CORPORATION OF NEW JERSEY

COTTON CLEANER

Application filed January 19, 1931. Serial No. 509,690.

This invention relates to a cotton cleaner attachment for tractors. More specifically it relates to the organization of a cotton cleaner in combination with a tractor, on which the cleaner is mounted and on which cotton harvesting units are mounted for collecting cotton and delivering it to the cleaner.

The object of the present invention is to provide a cleaner unit of simple and compact form which may be mounted on a tractor for cooperation with cotton harvesting means, and to devise means for supporting said cleaner in position and for driving the mechanisms thereof by power connections with the tractor. Other minor objects will be apparent from the detailed description to follow, in which:

Figure 1 is a plan view of the rear portion of a tractor, on which the cleaner of the invention is mounted;

Figure 2 is a rear view of the same structure shown in Figure 1; and

Figure 3 is a sectional view through the rear axle of the tractor and through the cleaner.

The tractor shown is of a well known type, having an extended rear axle 10 which is attached to the main body portion 11 of the tractor. Depending housings 12 at the ends of the axle contain gearing for driving the wheels 13 mounted on stub axles extending outwardly from the housings. This type of construction is adapted to span the space of two plant rows such as cotton, and is commonly termed an arched axle. A U-shaped rearwardly extending drawbar 14 is pivotally attached on trunnions 15 mounted on the inside lower portion of the housings 12. The drawbar 14 is so mounted that it may be swung into a plurality of positions. In the embodiment of this invention the drawbar is raised a considerable angle above horizontal and is rigidly held in such a position by angle bars 16 connected to the drawbar and to the rear axle housing of the tractor.

In a two-row organization, as herein disclosed, the cleaner consists of two independent units mounted at opposite sides of the tractor. Each unit consists of a casing 17, in which the cleaning mechanism is mounted.

The cleaning mechanism, insofar as this invention is concerned, may be of any known construction. The U. S. patent to Melton No. 1,638,867 shows one type of cleaning mechanism mounted in a casing. However, I prefer to use the particular type of cleaning mechanism described and claimed in my copending application Serial No. 483,163 filed September 20, 1930. The casings 17 are mounted on a framework which is secured to the drawbar of the tractor by bracing members 18 and 18' and is further held in position by bracing bars 19 which extend forwardly downwardly and are rigidly attached to the depending housings 12. Intermediate the two units a frame 20 is provided, to which a receiving bag 21 is attached. This frame has lateral flanges which are slidable on and are supported by angle bars 20$^a$ secured beneath the cleaner units. The casings 17 are arranged longitudinally of the tractor and are provided at their forward ends with feeding chutes 22. The harvesting mechanisms, which may be stripper units such as shown in my Patent No. 1,769,104 issued July 1, 1930 have discharge elevators 23 indicated in full lines in Figure 3 and in dotted lines in Figure 1, extending rearwardly over the rear axle of the tractor. Said elevators are positioned to discharge into the feeding chutes 22 at one end of the units. At the inner sides of the two cleaner units discharge chutes 24 are provided to deliver the clean cotton into the central receiving bag 21.

The cleaning mechanism of the cleaner units is driven from the tractor power take-off by a plurality of chains and sprockets in the following manner: Forwardly of each unit a shaft 25 extends from the casing of the unit and through a bearing support 26. The bearing supports 26 are mounted on a cross member 27 which is secured in position by upstanding brackets 28 mounted on the drawbar 14. On the forward end of the shafts 25 chain sprockets 29 are mounted for driving said shafts. The sprockets 29 are aligned with spaced sprockets 30 and 30' mounted on a shaft 31. A sprocket 32 is rotatably mounted on a bearing bracket 33 rigidly secured to the cross member 27 at one end thereof, beyond the bearing support 26 at that end in alignment with the sprocket 29. The drive chain operatively connecting the sprockets 32 and 29 with the sprocket 30, passes under the sprocket 29 and over the sprocket 32.

The shaft 31 is rotatably supported beneath the rear axle housing in a bearing bracket 34. Said shaft is positioned in alignment with a power take-off shaft 35 which extends rearwardly from a depending housing 36 positioned below the main transmission casing of the tractor. Said shafts are operatively connected by a universal joint 36'.

As will be well understood from the above description, the cleaner units of this invention may be readily and rigidly mounted at the rear of a tractor, particularly on a tractor having a construction similar to that shown in the drawings, with said units extending longitudinally rearwardly on each side of the tractor. The drawbar 14, together with the bracing bars 16 and 19, provide adequate means for supporting the cleaner in position. Cotton being gathered by the stripping units at the side of the tractor and delivered rearwardly by the elevators 23, is discharged into the respective chutes 22 on the cleaner units. The cotton passes rearwardly through said cleaning units and is discharged centrally into the receiving bag 21. By means of this construction a minimum handling of the stripped cotton is required. The clean material is delivered, after a short path of travel through the cleaning units, into the centrally located receiving bag 21. Said bag is carried in an accessible position, high enough above the ground to have a large capacity and yet in a position such that it may be readily removed when filled.

It is to be understood that applicant has shown only a preferred embodiment of his improved cleaner and that he contemplates the use of such a device wherever it may be utilized. The invention is, therefore, limited only to the scope of the appended claims.

What is claimed is:

1. The combination with a tractor having cotton stripping units mounted at each side thereof and positioned to deliver rearwardly above the rear axle of the tractor, of cleaner units mounted at each side of the tractor and positioned to receive cotton from the stripping units, and a receiving means for the cleaned cotton positioned between said units and carried thereby.

2. The combination with a tractor having cotton stripping units mounted at each side thereof and positioned to deliver rearwardly above the rear axle of the tractor, of a drawbar extending rearwardly from the tractor, means for supporting said drawbar in a raised position, a cleaner unit mounted at each side of the tractor on said drawbar and positioned to receive material from the stripping units, said cleaner units being arranged to discharge clean material centrally between said units, and a receiving means positioned between said units and carried thereby.

3. The combination with a tractor having an extended rear axle structure adapted to span two plant rows and a central forwardly extending body, of cotton gathering units supported on the tractor at each side of the body with a delivering conveyer extending rearwardly from each unit over the axle structure, a support extending rearwardly from the axle structure, laterally spaced cleaning units disposed in alignment with said delivering conveyers and secured to said support with the longer dimension of the units extending longitudinally of the tractor, a removable receptacle supported between the units, and chutes on the units for receiving material from the conveyers and delivering treated material to the receptacle.

In testimony whereof I affix my signature.

BERT R. BENJAMIN.